US009755810B2

(12) United States Patent
Gaal et al.

(10) Patent No.: US 9,755,810 B2
(45) Date of Patent: Sep. 5, 2017

(54) PRECODER RESOURCE BUNDLING INFORMATION FOR INTERFERENCE CANCELLATION IN LTE

(71) Applicant: QUALCOMM Incorporated, San Diego, CA (US)

(72) Inventors: Peter Gaal, San Diego, CA (US); Wanshi Chen, San Diego, CA (US); Tao Luo, San Diego, CA (US); Hao Xu, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 14/249,119

(22) Filed: Apr. 9, 2014

(65) Prior Publication Data

US 2014/0307703 A1  Oct. 16, 2014

Related U.S. Application Data

(60) Provisional application No. 61/811,633, filed on Apr. 12, 2013.

(51) Int. Cl.
*H04L 5/00* (2006.01)
*H04J 11/00* (2006.01)

(52) U.S. Cl.
CPC .......... *H04L 5/0073* (2013.01); *H04J 11/005* (2013.01); *H04L 5/0035* (2013.01); *H04L 5/0048* (2013.01); *H04L 5/0007* (2013.01)

(58) Field of Classification Search
None
See application file for complete search history.

(56) References Cited

U.S. PATENT DOCUMENTS

2012/0099544 A1  4/2012 Pajukoski et al.
2012/0236752 A1*  9/2012 Hu ...................... H04L 25/0228
370/252

(Continued)

FOREIGN PATENT DOCUMENTS

WO  WO-2011160097 A1  12/2011

OTHER PUBLICATIONS

ISA/EPO, International Search Report and Written Opinion of the International Searching Authority, Int'l App. No. PCT/US2014/033596, Jul. 25, 2014, European Patent Office, Rijswijk, NL, 12 pgs.

(Continued)

*Primary Examiner* — Michael Thier
*Assistant Examiner* — Kent Krueger
(74) *Attorney, Agent, or Firm* — Holland & Hart LLP

(57) ABSTRACT

Methods, systems, and devices are described for interference cancellation/interference suppression (IC/IS) of neighbor cell transmissions. A UE may receive a downlink transmission from a base station and also receive interfering signals from one or more neighboring base stations. The UE may be configured to perform IC/IS operations on the interfering signals. In order to enhance IC/IS operations, the UE may evaluate whether resource bundling is used for the interfering signals. The UE may modify IC/IS operations for one or more subframes responsive to the evaluation. Modifying IC/IS operations may include, for example, using information related to the bundling at the neighboring base station(s) to cancel the interfering signals from the base station(s).

27 Claims, 11 Drawing Sheets

(56) References Cited

U.S. PATENT DOCUMENTS

2013/0053077 A1  2/2013  Barbieri et al.
2013/0242886 A1* 9/2013  Chen .................... H04L 5/1469
                                             370/329
2013/0273950 A1* 10/2013 Sun ..................... H04W 28/048
                                             455/501

OTHER PUBLICATIONS

IPEA/EPO, Second Written Opinion of the International Preliminary Examining Authority, In'l App. No. PCT/US2014/033596, Apr. 24, 2015, European Patent Office, Munich, DE, 7 pgs.

* cited by examiner

PRECODER RESOURCE BUNDLING INFORMATION FOR INTERFERENCE CANCELLATION IN LTE

CROSS REFERENCES

The present application for patent claims priority to U.S. Provisional Patent Application No. 61/811,633 by Gaal et al., entitled "PRECODER RESOURCE BUNDLING INFORMATION FOR INTERFERENCE CANCELLATION IN LTE", filed Apr. 12, 2013, assigned to the assignee hereof, and expressly incorporated by reference herein.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations that can support communication for a number of mobile devices. In some technologies, mobile devices may be called access terminals, user equipments (UEs), mobile stations, and the like. A mobile device may communicate with a base station via downlink (DL) and uplink (UL) transmissions. The downlink (or forward link) refers to the communication link from the base station to the mobile device, and the uplink (or reverse link) refers to the communication link from the mobile device to the base station. Each base station has a coverage range, which may be referred to as the coverage area of the cell.

In cellular deployments, a macrocell is used to describe a cell serving a wide region such as rural, suburban, and urban areas. Smaller cells may be deployed in homes, small businesses, buildings, or other limited regions. These small cells may be called "picocells" or "femtocells." Picocells and femtocells are often connected to a service provider's network via a broadband connection. In 3GPP terms, these cells may be referred to as Home NodeBs (HNB) for UMTS (WCDMA, or High Speed Packet Access (HSPA)) and Home eNodeBs (HeNB) for LTE/LTE-A networks. Some small cells provide access by UEs having an association with the cell, and in some deployments one or more clusters of small cells may provide access by UEs within specific particular areas or buildings (e.g., parks, shopping malls, etc.). Some small cells may be restricted access cells, sometimes referred to as closed subscriber group (CSG) cells. Cells (e.g., macrocells, picocells, femtocells, etc.) that provide access to UEs associated with one or more provider networks without a specific association between the UE and the cell may be called open access cells.

While small cells typically transmit at lower power than macrocells, signals from a small cell may be received at a UE with relatively high signal strength compared to signals received from the macrocell. For example, where a UE is located near a cell edge for a macrocell but relatively close to a remote radio head (RRH) of a small cell, the small cell signals received at the UE may be as strong as or even stronger than the signals received from the macrocell. In instances where the UE is communicating with the macrocell and not the small cell, the UE may have difficulty finding and decoding the appropriate signals from the macrocell for establishing a communication link with the macrocell due to interference from the small cell signals. Similarly, signals from a macrocell may be received at a UE with relatively high strength relative to signals from a small cell. In some such instances, it may be desirable for the UE to establish communications with the small cell and the UE may have difficulty finding and decoding the appropriate signals from the small cell for establishing a communication link with the small cell due to interference from the macrocell signals. Various techniques for interference cancellation/suppression (IC/IS) may be used to reduce or cancel such interference.

SUMMARY

The described features generally relate to one or more improved systems, methods, and/or apparatuses for interference cancellation/interference suppression (IC/IS) of neighbor cell transmissions. A user equipment (UE) may, for example, receive a downlink transmission from a base station and also receive interfering signals from one or more neighboring base stations. The UE may be configured to perform IC/IS operations on the interfering signals. In order to enhance IC/IS operations, the UE may evaluate whether resource bundling is used for the interfering signals. The UE may modify IC/IS operations for one or more subframes responsive to the evaluation. Modifying IC/IS operations may include, for example, using information related to the bundling at the neighboring base station(s) to cancel the interfering signals from the base station(s).

In one aspect, a method for wireless communications performed by a user equipment (UE) is described. The method generally includes identifying a neighboring base station scheduled to transmit interfering signals during transmission of a subframe from a serving base station, evaluating whether precoder resource bundling is used for the interfering signals, and modifying interference cancellation/interference suppression (IC/IS) operations for the subframe responsive to the evaluating. The precoder resource bundling may include, for example, physical resource block (PRB) bundling across frequency or subframe bundling across time. In some embodiments, the evaluating may include disregarding precoder resource bundling in the absence of an indication from the serving base station that precoder resource bundling is present in the interfering signals. In some embodiments, modifying IC/IS operations for the subframe includes enhancing cancellation of a demodulation-reference signal (DM-RS) based physical downlink shared channel (PDSCH) signal.

Additionally or alternatively, the evaluating may include determining a likelihood that communications of the neighboring base station include precoder resource bundling. Such a determination may include, in some embodiments, receiving a signal from the neighboring base station, estimating a channel characteristic for one or more of adjacent PRBs or adjacent subframes of the received signal, and determining that precoder resource bundling is present when a difference in channel estimates is below a threshold. The threshold may be selected, for example, from two or more thresholds based on a location of a resource block group (RBG) boundary of the received signal relative to the adjacent PRBs or adjacent subframes. In some embodiments, the method further includes refining the estimate of the channel characteristics by re-estimating channel characteristics of one or more precoding resource block groups (PRGs) of the received signal that are determined to be bundled. Additionally or alternatively, the method may further include determining whether enhanced physical downlink control channel (EPDCCH) information is present in a precoding resource block group (PRG) of the received signal, and excluding one or more PRB pairs corresponding to the EPDCCH from the estimating.

In some embodiments, the evaluating may include evaluating signals from at least one of the serving base station or the neighboring base station for an indication of whether the UE is to account for the presence of precoder resource bundling for one or more interfering signals or to disregard precoder resource bundling for one or more interfering signals. The indication may include, for example, one or more of an indication that precoder resource bundling is not present for one or more interfering signals, an indication that precoder resource bundling is present for at least a majority of the one or more interfering signals, an indication that precoder resource bundling is present in two or more subframes, or an indication that precoder resource bundling is present in all precoding resource block groups (PRGs) of a subframe. In some embodiments, the indication may include an indication that precoder resource bundling is present in all precoding resource block groups (PRGs) of a subframe and that, within PRGs, one or more of rank, precoder, power level, or modulation order are identical. The indication may include, for example, a one-bit indication for each of one or more virtual cell identifications (VCIDs) indicating whether the UE is to assume the presence of precoder resource bundling for signals using one of the one or more VCIDs. In some embodiments, the UE may be configured for coordinated multi-point (CoMP) transmissions, and the indication may include an indication that interfering signals have the same configuration as the UE CoMP configuration. In other embodiments, the indication may include a subset of resources for which the UE is to assume the presence of precoder resource bundling.

In some embodiments, the evaluating may include one or more of receiving an indication from at least one of the serving base station or the neighboring base station indicating that precoder resource bundling is present for one or more identified modulation orders of the neighboring base station, or receiving an indication from at least one of the serving base station or the neighboring station indicating that precoder resource bundling is not present for one or more identified types of transmissions of the neighboring base station. The evaluating may include, for example, receiving an indication of precoder resource bundling in at least one of a physical downlink shared channel (PDSCH) grant or an enhanced PDCCH (EPDCCH) from the serving base station. Such signaling may include, for example, a bitmap indicating which of a subset of resources are bundled.

In another aspect, an apparatus for wireless communications performed by a UE is provided. The apparatus generally includes means for identifying a neighboring base station scheduled to transmit interfering signals during transmission of a subframe from a serving base station, means for evaluating whether precoder resource bundling is used for the interfering signals, and means for modifying interference cancellation/interference suppression (IC/IS) operations for the subframe responsive to the evaluating. The precoder resource bundling may include, for example, physical resource block (PRB) bundling across frequency or subframe bundling across time. The means for modifying IC/IS operations for the subframe may include, for example, means for enhancing cancellation of a demodulation-reference signal (DM-RS) based physical downlink shared channel (PDSCH) signal.

In some embodiments, the means for evaluating may include means for disregarding precoder resource bundling in the absence of an indication from the serving base station that precoder resource bundling is present in the interfering signals. In other embodiments, the means for evaluating may include means for determining a likelihood that communications of the neighboring base station include precoder resource bundling. In other embodiments, the means for evaluating may include means for receiving a signal from the neighboring base station, means for estimating a channel characteristic for one or more of adjacent PRBs or adjacent subframes of the received signal, and means for determining that precoder resource bundling is present when a difference in channel estimates is below a threshold. The threshold may be selected, for example, from two or more thresholds based on a location of a resource block group (RBG) boundary of the received signal relative to the adjacent PRBs or adjacent subframes. In some embodiments, the apparatus further includes means for refining the estimate of the channel characteristics by re-estimating channel characteristics of one or more precoding resource block groups (PRGs) of the received signal that are determined to be bundled. In other configurations, the apparatus also includes means for determining whether enhanced physical downlink control channel (EPDCCH) information is present in a precoding resource block group (PRG) of the received signal, and means for excluding one or more PRB pairs corresponding to the EPDCCH from the estimating.

According to some embodiments, the means for evaluating may include means for evaluating signals from at least one of the serving base station or the neighboring base station for an indication of whether the UE is to account for the presence of precoder resource bundling for one or more interfering signals or to disregard precoder resource bundling for one or more interfering signals. The indication may include, for example, one or more of an indication that precoder resource bundling is not present for one or more interfering signals, an indication that precoder resource bundling is present for at least a majority of the one or more interfering signals, an indication that precoder resource bundling is present in two or more subframes, or an indication that precoder resource bundling is present in all precoding resource block groups (PRGs) of a subframe. In some embodiments, the indication may include an indication that precoder resource bundling is present in all precoding resource block groups (PRGs) of a subframe and that, within PRGs, one or more of rank, precoder, power level, or modulation order are identical. Additionally or alternatively, the indication may include a one-bit indication for each of one or more virtual cell identifications (VCIDs) indicating whether the UE is to assume the presence of precoder resource bundling for signals using one of the one or more VCIDs. In some embodiments, the UE may include a configuration for coordinated multi-point (CoMP) transmissions, and the indication may include an indication that interfering signals have the same configuration as the UE CoMP configuration. In some embodiments, the indication may include a subset of resources for which the UE is to assume the presence of precoder resource bundling.

The means for evaluating, in some embodiments, may include means for receiving an indication from at least one of the serving base station or the neighboring base station indicating that precoder resource bundling is present for one or more identified modulation orders of the neighboring base station. The means for evaluating, in some embodiments, may include means for receiving an indication from at least one of the serving base station or the neighboring base station indicating that precoder resource bundling is not present for one or more identified types of transmissions of the neighboring base station. In other embodiments, the means for evaluating may include means for receiving an indication of precoder resource bundling in at least one of a physical downlink shared channel (PDSCH) grant or an enhanced PDCCH (EPDCCH) from the serving base station. The means for signaling may include, for example, a bitmap indicating which of a subset of resources are bundled.

In another aspect, a wireless communications UE device is disclosed. The device generally includes at least one processor and a memory coupled with the processor. The memory may embody instructions executable by the processor to cause the processor to identify a neighboring base station scheduled to transmit interfering signals during transmission of a subframe from a serving base station, evaluate whether precoder resource bundling is used for the interfering signals, and modify IC/IS operations for the subframe responsive to the evaluating. In some embodiments, the instructions are further executable by the processor to disregard precoder resource bundling in the absence of an indication from the serving base station that precoder resource bundling is present in the interfering signals.

In some embodiments, the instructions may be further executable by the processor to determine a likelihood that communications of the neighboring base station include precoder resource bundling. The instructions, in some embodiments, may be further executable by the processor to receive a signal from the neighboring base station, estimate a channel characteristic for one or more of adjacent PRBs or adjacent subframes of the received signal, and determine that precoder resource bundling is present when a difference in channel estimates is below a threshold. The instructions, in some embodiments, may be further executable by the processor to refine the estimate of the channel characteristics by re-estimating channel characteristics of one or more PRGs of the received signal that are determined to be bundled.

In some embodiments, the instructions may be further executable by the processor to evaluate signals from the serving base station for an indication of whether the UE is to account for the presence of precoder resource bundling for one or more interfering signals or to disregard precoder resource bundling for one or more interfering signals. The indication may include, for example, one or more of an indication that precoder resource bundling is not present for one or more interfering signals, an indication that precoder resource bundling is present for at least a majority of the one or more interfering signals, an indication that precoder resource bundling is present in two or more subframes, or an indication that precoder resource bundling is present in all precoding resource block groups (PRGs) of a subframe.

In another aspect, a computer program product for performing wireless communications by a UE is disclosed. The computer program product generally includes a non-transitory computer-readable medium that may store instructions executable by a processor to identify a neighboring base station scheduled to transmit interfering signals during transmission of a subframe from a serving base station, evaluate whether precoder resource bundling is used for the interfering signals, and modify interference cancellation/interference suppression (IC/IS) operations for the subframe responsive to the evaluating.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
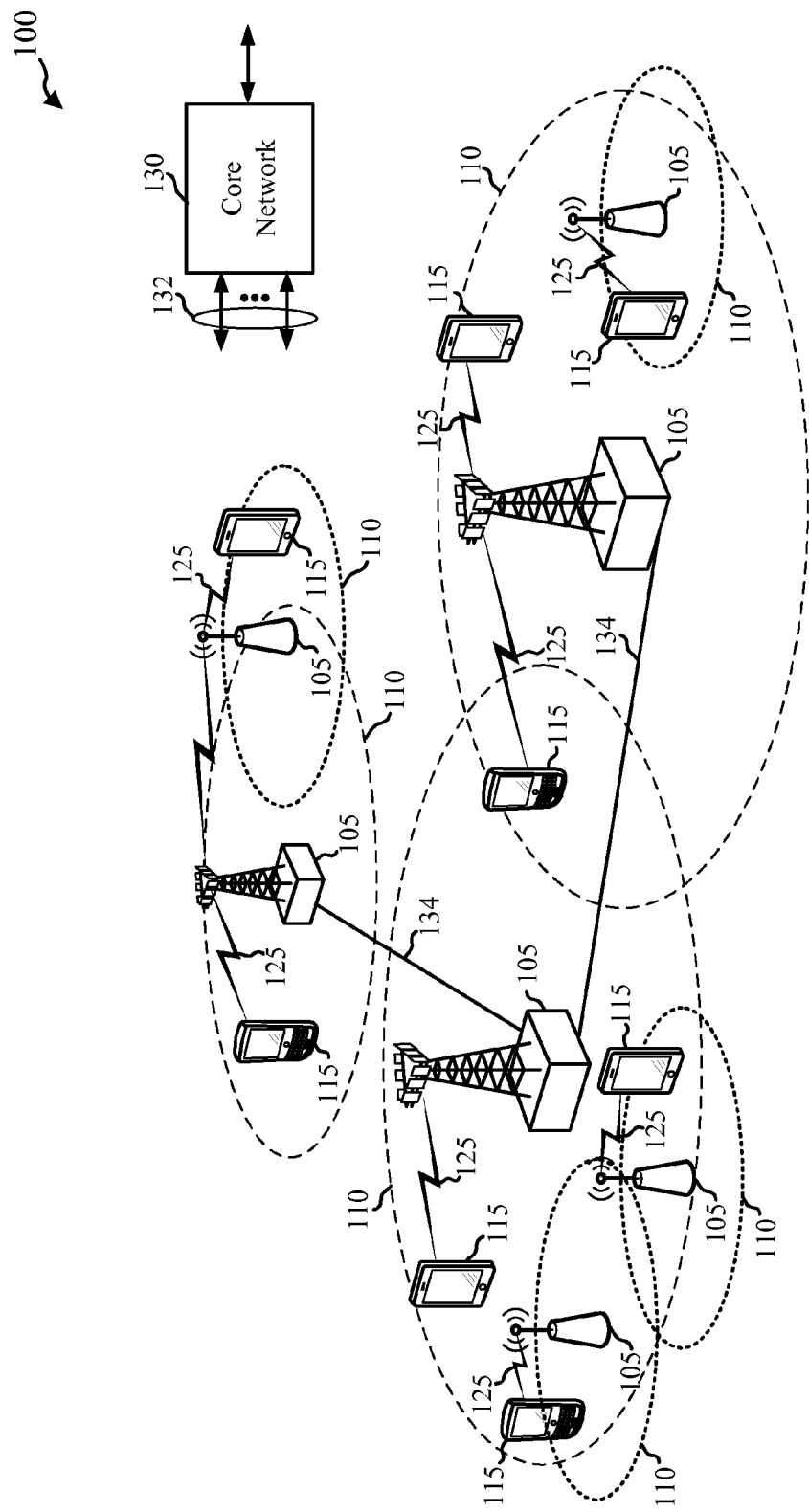
FIG. 1 is a diagram illustrating an example of a wireless communications system in accordance with various embodiments.

Various aspects of the disclosure provide for interference cancelation/interference suppression (IC/IS) of neighbor cell transmissions. A UE may, for example, receive a downlink transmission from a base station and also receive interfering signals from one or more neighboring base stations. The UE may be configured to perform IC/IS operations on the interfering signals. In order to enhance IC/IS operations, the UE may evaluate whether resource bundling is used for the interfering signals. The UE may modify IC/IS operations for one or more subframes responsive to the evaluation. Modifying IC/IS operations may include, for example, using information related to the bundling at the neighboring base station(s) to cancel the interfering signals from the base station(s).

In some embodiments, a base station may transmit information related to resource bundling for one or more neighboring base stations to the UE for use in evaluation of whether resource bundling is used for the interfering signals and/or for use in modifying IC/IS operations. In other embodiments, the UE may evaluate the interfering signals themselves and determine whether the interfering signals use resource bundling. Resource bundling may include, for example, resource bundling across frequencies for multiple physical resource blocks (PRBs) and/or resource bundling across time for multiple subframes.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), or some other suitable terminology. The coverage area 110 for a base station may be divided into sectors making up only a portion of the coverage area (not shown). The wireless communications system 100 may include base stations 105 of different types (e.g., macro, pico, femto, or micro base stations). There may be overlapping coverage areas for different technologies.

The UEs 115 are dispersed throughout the wireless communications system 100, and each device may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro base stations, pico base stations, femto base stations, relay base stations, and the like.

The communication links 125 shown in the wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions.

In embodiments, the wireless communications system 100 is an LTE/LTE-A network. In LTE/LTE-A networks, the terms evolved Node B (eNB) and user equipment (UE) may be generally used to describe the base stations 105 and UEs 115, respectively. The wireless communications system 100 may be a Heterogeneous LTE/LTE-A network in which different types of eNBs provide coverage for various geographical regions. For example, each base station 105 may provide communication coverage for a macrocell, a picocell, a femtocell, or other types of cell. A macrocell generally covers a relatively large geographic area (e.g., several kilometers in radius) and may allow unrestricted access by UEs with service subscriptions with the network provider. Picocells and femtocells would generally cover relatively smaller geographic areas (e.g., a building, a home, and the like). An eNB for a macrocell may be referred to as a macro eNB. An eNB for a picocell may be referred to as a pico eNB, and an eNB for a femtocell may be referred to as a femto eNB or a home eNB. An eNB may support one or multiple (e.g., two, three, four, and the like) cells.

Strategic deployment of picocells and femtocells may be used to mitigate mobile device power consumption, as UEs 115 typically operate using an internal power supply, such as a small battery, to facilitate highly mobile operation. For example, femtocells may be utilized to provide service within areas which might not otherwise experience adequate or even any service (e.g., due to capacity limitations, bandwidth limitations, signal fading, signal shadowing, etc.), thereby allowing UEs 115 to reduce searching times, to reduce transmit power, to reduce transmit times, etc. Thus, where a UE 115 is served by a picocell or femtocell, it is typically located relatively close the serving cell, often allowing the UE 115 to communicate with reduced transmission power.

The wireless communications system 100 according to an LTE/LTE-A network architecture may be referred to as an Evolved Packet System (EPS). The wireless communications system 100 may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The wireless communications system 100 may interconnect with other access networks using other Radio Access Technologies. For example, the wireless communications system 100 may interconnect with a UTRAN-based network and/or a CDMA-based network. To support mobility of UEs 115 and/or load balancing, the wireless communications system 100 may support handover of UEs 115 between a source base station 105 and a target base station 105. The wireless communications system 100 may support intra-RAT handover between base stations 105 of the same RAT (e.g., other E-UTRAN networks), and inter-RAT handovers between base stations 105 of different RATs (e.g., E-UTRAN to CDMA, etc.). The wireless communications system 100 may provide packet-switched services, however, as those skilled in the art will readily appreciate, the various concepts presented throughout this disclosure may be extended to networks providing circuit-switched services.

The E-UTRAN may include the base stations 105 and may provide user plane and control plane protocol terminations toward the UEs 115. Any of the base stations 105 may be connected to other base stations 105 via backhaul links 132 or 134 (e.g., an X2 interface, and the like). The base stations 105 may provide an access point to the core network 130 for the UEs 115. The base stations 105 may be connected by backhaul link 132 (e.g., an S1 interface, and the like) to the core network 130. Logical nodes within the core network 130 may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service.

The UEs 115 may be configured to communicate with one or multiple base stations 105 through, for example, Multiple Input Multiple Output (MIMO), Coordinated Multi-Point (CoMP), or other schemes. MIMO techniques use multiple antennas on one or more base station(s) 105 and/or multiple antennas on a UE 115 to transmit multiple data streams and thereby enhance data throughput. Each data stream may be called a "layer" and the "rank" of the communication link may indicate the number of layers used for communication. CoMP includes techniques for dynamic coordination of transmission and reception by a number of base stations 105 to improve overall transmission quality for UEs 115 as well as increasing network and spectrum utilization. Generally, CoMP techniques utilize backhaul links 132 and/or 134 for communication between base stations 105 to coordinate control plane and user plane communications for the UEs 115.

One or more base stations 105 utilizing MIMO and/or CoMP may employ precoding to support multi-stream (or multi-layer) transmission in multi-antenna implementations. Precoding provides that multiple data streams may be emitted from transmit antennas with independent and appropriate weightings provided in a precoding vector. In some examples, the precoding vector may be defined by a precoding matrix indicator (PMI), such that the link throughput is enhanced at the receiver output. In some examples, in the transmission of a demodulation reference signal (DM-RS), the precoding vector may not be explicitly signaled. Within a base station 105 utilizing MIMO, in some examples, circuitry within a signal transmit path may perform precoding on multiple physical resource blocks (PRBs) in the frequency domain to perform a same precoding over a bundled resource block. Such a bundled resource block may include multiple consecutive PRBs in the frequency domain, for example. Precoder resource bundling may also include bundling of resources across time, and the bundled resources may include multiple consecutive subframes, for example.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

The downlink physical channels may include at least one of a physical broadcast channel (PBCH), a physical downlink control channel (PDCCH), a physical HARQ indicator channel (PHICH), and a physical downlink shared channel (PDSCH). A control format indicator (CFI) carried in a physical control format indicator channel (PCFICH) may indicate the number of symbols in the PDCCH for a particular downlink subframe. The uplink physical channels may include at least one of a physical uplink control channel (PUCCH) and a physical uplink shared channel (PUSCH). The PDCCH may carry downlink control information (DCI), which may indicate data transmissions for UEs on the PDSCH as well as provide UL resource grants to UEs for the PUSCH. The UE may transmit control information in the PUCCH on the assigned resource blocks in the control section. The UE may transmit only data or both data and control information in the PUSCH on the assigned resource blocks in the data section.

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands. The carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

Figure 2:
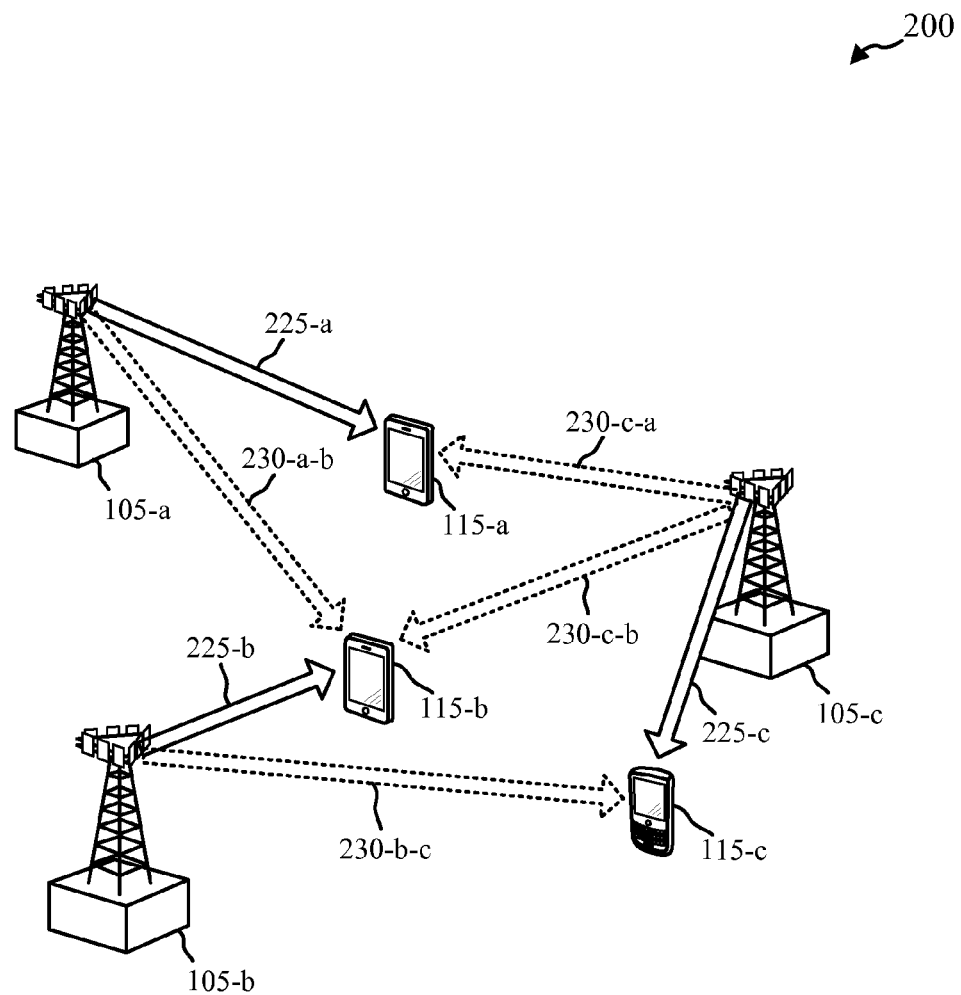
FIG. 2 illustrates exemplary cells and potential interference between a UE and a neighboring cell in accordance with various embodiments.

FIG. 2 is diagram of a wireless communications system 200 for adaptive interference cancellation in accordance with various embodiments. The wireless communications system 200 may illustrate, for example, aspects of the wireless communications system 100 illustrated in FIG. 1. The wireless communications system 200 may include eNB 105-a, eNB 105-b, and eNB 105-c and UE 115-a, UE 115-b, and UE 115-c. The eNBs 105-a, 105-b, 105-c may be examples of one or more of the base stations 105 described with reference to FIG. 1. Similarly, the UEs 115-a, 115-b, 115-c may be examples of one or more of the UEs 115 described with reference to FIG. 1.

The wireless communications system 200 illustrates serving cell transmissions 225 and interfering transmissions 230. For example, UE 115-a may be served by eNB 105-a and the serving eNB 105-a may transmit data in serving cell transmission 225-a for UE 115-a. In the wireless communications system 200, eNB 105-b may transmit data in serving cell transmission 225-b to UE 115-b using the same frequency resources as serving cell transmission 225-a. Serving cell transmission 225-a by eNB 105-a may result in interfering transmission 230-a-b received by UE 115-b. Serving cell transmissions 225-a, 225-b, and 225-c may also result in interfering transmissions 230-c-a, 230-b-c, and 230-c-b to UEs 115-a, 115-b and 115-c. FIG. 2 illustrates downlink serving cell transmissions and interfering transmissions. However, similar interference issues may occur on the uplink for reception of UE transmissions at eNBs 105.

UEs 115 and eNBs 105 may employ various techniques for advanced interference management. These techniques, referred to as interference cancellation/interference suppression (IC/IS), may employ, for example, one or more of minimum mean squared error (MMSE) interference rejection, multi-user detection (MUD) employing joint maximum likelihood (ML) detection for the desired signal and interfering signals, spatial interference rejection based on linear equalization, symbol-level interference cancellation (SLIC), or codeword-level interference cancellation (CWIC).

In SLIC, the most likely transmitted bits of an interfering signal may be estimated based on the spatial scheme and modulation format employed for the transmission. An estimate of the interfering signal may be reconstructed using the estimated bits, spatial scheme, and modulation format, and the estimated interfering signal is then subtracted from the received signal. CWIC exploits error-correction coding applied to the interfering data channel in order to estimate the interfering signal for interference cancellation. For example, in LTE the PDSCH is turbo-encoded, where the parameters necessary for decoding may be provided to the UE for which the PDSCH payload is intended via DCI in the PDCCH. In CWIC, a UE obtains and/or determines one or more parameters for decoding an interfering PDSCH transmission intended for a different UE and decodes the interfering PDSCH transmission. The UE then reconstructs the interfering signal from the decoded bits of the PDSCH transmission and subtracts the reconstructed signal from the received signal.

To decode PDSCH payloads, the UE may use, for example, the code rate or transport block size (TBS), the physical resource block (PRB) allocation, and the redundancy version (RV). Additionally, as mentioned above, in some examples an interfering signal may employ precoding resource bundling, in which a precoding vector may be used on resources bundled across frequency (i.e., PRB bundling), or across time (i.e., subframe bundling). According to various embodiments, as will be described in more detail below, resource bundling information may also be used to decode payloads of interfering signals. The UE may obtain these transmission parameters via one or more of network signaling, blind detection, or decoding of DCI or other information associated with the interfering signals. In system environments where the network provides one or more of these transmission parameters, UEs may receive decoding information for payloads intended for other UEs that may cause interference to the UEs. The network may provide this information, for example, in broadcast or control messages.

Figure 3:
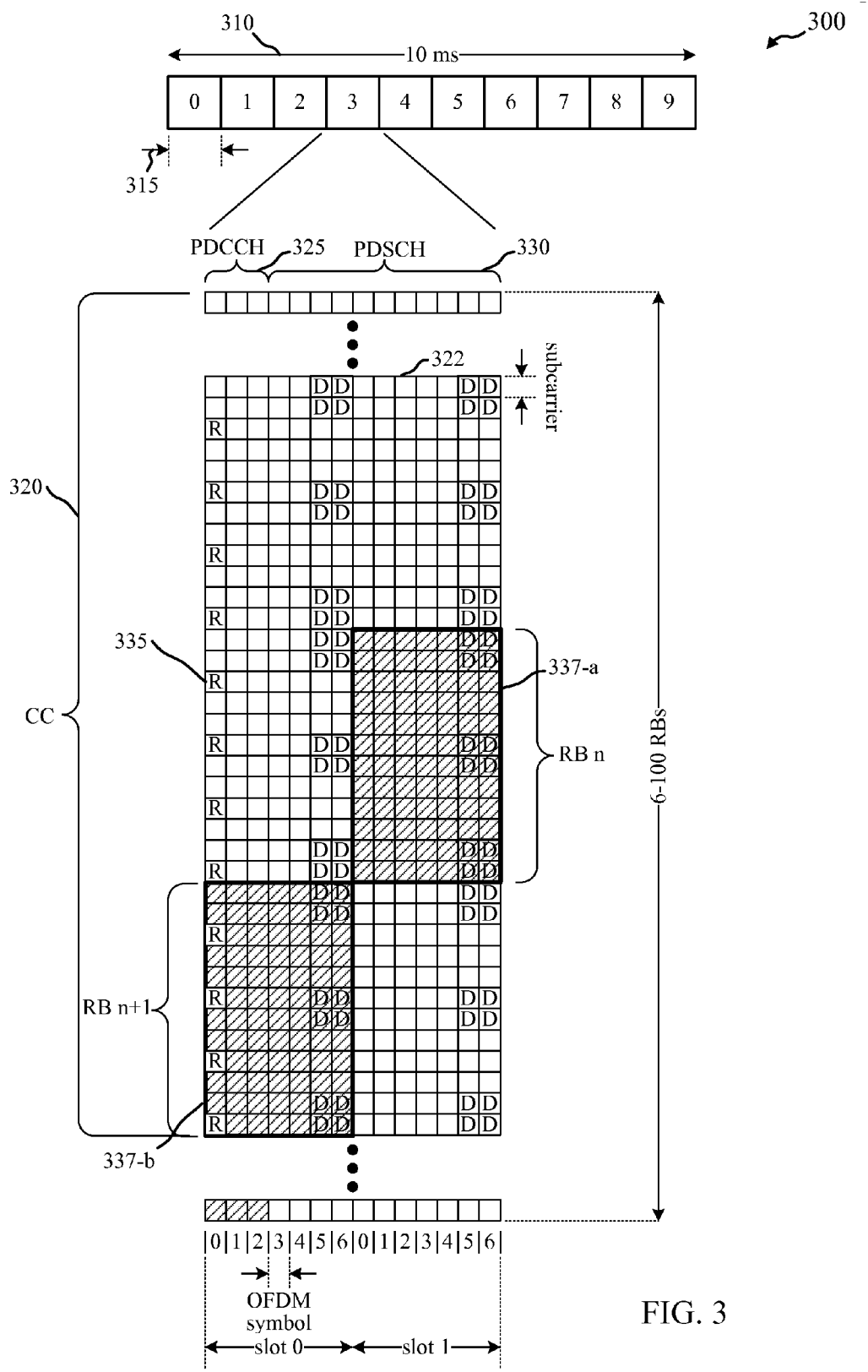
FIG. 3 shows a diagram of exemplary frames and precoder resource bundling in accordance with various embodiments.

As discussed above, the same precoding may be performed over bundled resources in some examples. FIG. 3 is a diagram illustrating an example of a downlink frame structure 300 including different resources that may be bundled in a wireless communication system, including the wireless communications systems 100 or 200. The downlink frame structure 300 may have a radio frame length 310 of 10 milliseconds (ms) and may include 10 subframes 315 of 1 ms each. Each subframe 315 may be further divided into two slots or half-subframes of length 0.5 ms, where each slot may contain six or seven symbols. An OFDMA component carrier 320 may be illustrated as a resource grid representing two time slots. The resource grid may be divided into multiple resource elements 322. Each resource element may carry a modulated symbol.

As illustrated in FIG. 3, PDCCH 325 is generally time-division multiplexed with PDSCH 330 and generally is fully distributed within the entire bandwidth of the OFDMA component carrier 320 within a first region of each subframe 315. In the example illustrated in FIG. 3, PDCCH 325 takes up the first three symbols of the subframe 315. PDCCH 325 may have more or fewer symbols as is appropriate based on the component carrier bandwidth and amount of control information for the subframe 315. The PHICH and/or PCFICH channels may be found in the first symbol of PDCCH 325.

In LTE/LTE-A, physical resource blocks (PRBs) 337-a, 337-b, corresponding to PRB-n and PRB-n+1, may each contain 12 consecutive subcarriers in the frequency domain and, for a normal cyclic prefix in each OFDM symbol, 7 consecutive OFDM symbols in the time domain, or 84 resource elements. Some of the resource elements, designated R (e.g., 335), may include DL reference signals (DL-RS). The DL-RS may include Cell-specific RS (CRS) (also sometimes called common RS) and UE-specific RS (UE-RS). UE-RS may be transmitted only on the resource blocks upon which the corresponding physical DL shared channel (PDSCH) 330 is mapped. The number of bits carried by each resource element may depend on the modulation scheme. Thus, the more resource blocks that a UE receives and the higher the modulation scheme, the higher the data rate may be for the UE.

In other examples, such as may be used in LTE-A transmit mode 9 (TM9), a demodulation RS (DM-RS) may be used, and resource elements designated D may include DM-RS information. In TM9, DM-RS may be provided for antenna ports 7-14, with the predetermined DM-RS resource blocks in a PRB including DM-RS for specific antenna ports. In order to discriminate among the DM-RSs mapped to the same location, Code Division Multiplexing (CDM) may be used with the codes assigned to the respective ports. Furthermore, TM9 supports precoder resource bundling, which allows a same precoding vector across contiguous PRBs 337. Such bundling may have a bundling size that determines the number of PRBs 337 to be precoded based on the same precoding vector. The number and location of bundled PRBs may be, for example, channel bandwidth dependent, and defined by identified PRB groups (PRGs). In some examples, EPDCCH and PDSCH may share the same PRG. In such cases, some PRB pairs in a PRG may include EPDCCH information, while other PRB pairs in the same PRG may include PDSCH data of the same UE or different UEs. The DM-RS based precoding, however, may be transparent to the UE, and the precoding vector may not be explicitly signaled. A UE in such a case may estimate the precoded channel based on the DM-RS in every PRB pair. In some examples, precoding may be set based on UE PMI feedback, and the eNB may not know the channel with PRB level granularity.

Figure 4:
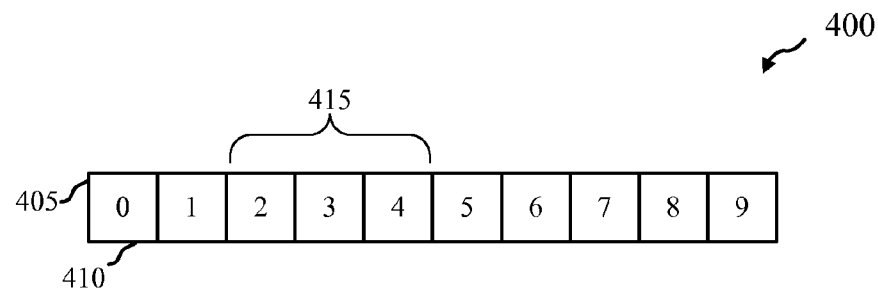
FIG. 4 shows another diagram of exemplary frames and precoder resource bundling in accordance with various embodiments.

The examples of FIG. 3 illustrate that PRBs may be bundled, with bundled PRBs using the same precoding vector. Such bundling may be done across multiple frequencies that may be used in the transmission of each PRB 337. Precoder resource bundling may also include bundling across time, or subframe bundling. With reference now to FIG. 4, a diagram illustrates an example of a downlink frame structure 400 including different resources that may be bundled across time in a wireless communication system, including the wireless communications systems 100 or 200. The downlink frame structure 400 includes a frame 405 that includes 10 subframes 410, designated as subframes 0 through 9. In this example, subframes 2, 3, and 4 may be included in a bundled group 415, in which the same precoding vector may be applied across the contiguous subframes 410. A bundling size may determine the number of subframes 410 that may be precoded based on the same precoding vector.

Bundling in such a manner as described with respect to FIGS. 3-4 may enable UEs to estimate the precoded channel jointly across PRBs or subframes, which may improve channel estimation performance. In some embodiments, as will be described in more detail below, in the event that an interfering signal includes precoder resource bundling, a UE, an eNB, and/or another network entity may estimate the interfering signal in a similar manner, for use in IC/IS operations at the UE. As noted above, a UE, base station, and/or other network entity, however, may not know whether PRB and/or subframe bundling is used for interfering signals. For example, a UE may not have such knowledge because in some cases PRB bundling may be a function of the RI/PMI feedback configuration of the different UE for which the interfering signal is transmitted. A UE attempting interference cancellation may not have information on the other UE's feedback configuration, and thus may not know whether PRB and/or subframe bundling is used for the interfering signals. Further, as mentioned above, PRB/subframe bundling may be a function of the transmit mode of the other UE. For example, bundling may be present if the other UE is using TM9, and may not be present if the other UE is using TM8. A UE attempting interference cancellation may not have information on the other UEs TM configuration and thus may not know whether PRB and/or subframe bundling is used for the interfering signals. Additionally, PRB bundling may be interrupted by the boundaries between PRB allocations for different UEs. For example, PRB k and k+1 could be bundled when they are allocated to the same UE, but not bundled when they are allocated to different UEs. A UE attempting interference cancellation may not have information on the other UEs' allocated resource boundaries, and thus may not know whether PRB and/or subframe bundling is used for the interfering signals.

Figure 5:
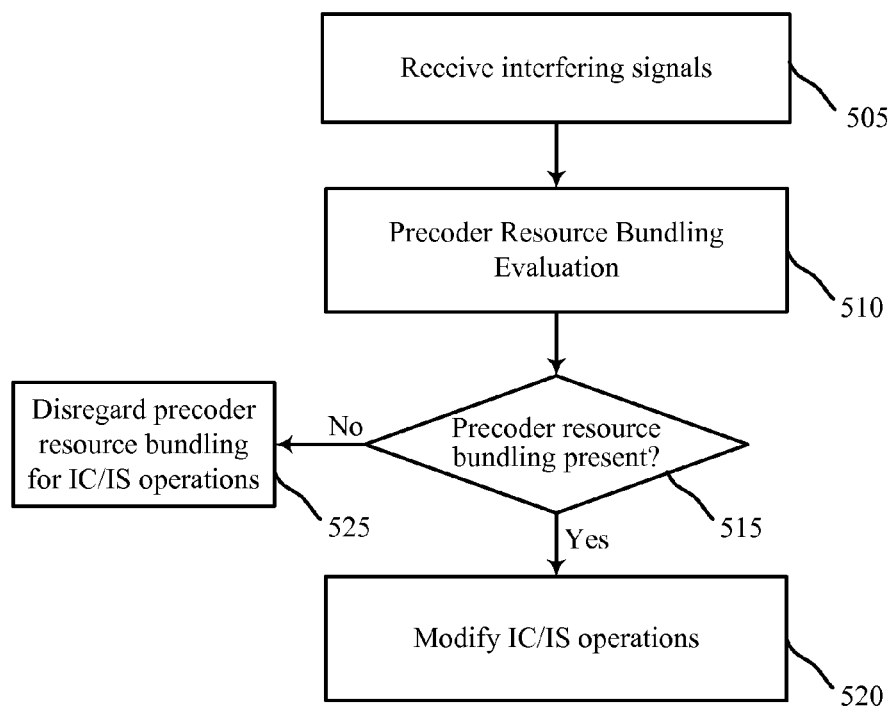
FIG. 5 is a flowchart of a method for IC/IS operations based on precoder resource bundling in accordance with various embodiments.

FIG. 5 is a flow chart illustrating a method 500 of precoder resource bundling evaluation according to various embodiments. The method 500 may, for example, be performed by a UE, a base station, or other network entity of FIG. 1 or 2, or using any combination of the devices described for these figures. Initially, interfering signals are received at block 505. Precoder resource bundling associated with the interfering signals may be evaluated, according to block 510. Based on the evaluation of the interfering signals it is determined at block 515 if precoder resource bundling is used in the interfering signals. If it is determined that precoder resource bundling is used, IC/IS operations are modified, as indicated at block 520. The modified IC/IS operations may be provided to improve estimation of the interfering signals, in order to provide more effective cancellation of the interfering signals. IC/IS operations may be modified, for example, by refining the channel estimate by re-estimating the channel in PRGs that were determined to be bundled, and the refined estimate used for interference cancellation. If it is determined that precoder resource bundling is not present at block 515, precoder resource bundling is disregarded for IC/IS operations, as indicated at block 525. According to various embodiments, the precoder resource bundling evaluation of block 510 may be based on assistance information received for the interfering signals or neighboring base station transmitting the interfering signals. Such assistance information will be described in further detail below, and may include, for example, information that the interfering signal contains certain resource bundling that may be used to modify IC/IS operations. In the event that no assistance information is received, the precoder resource bundling evaluation of block 510 may lead to a determination at block 515 that bundling is not present.

In other embodiments, precoder resource bundling evaluation of block 510 may include blind detection of the likely presence of precoder resource bundling in an interfering signal. Such blind detection may be performed, for example, by first estimating the received channel based on no bundling assumption. Next, estimations may be made for adjacent PRBs and/or adjacent subframes in the channel, which may be compared to the channel estimation. The blind detection may then attempt to detect the presence of EPDCCH in a PRG. When EPDCCH is detected, the corresponding PRB pairs are excluded from the PRG for PRB bundling operation. If the difference from the comparison is smaller than a predetermined threshold, a determination may be made that bundling was used. If the difference is larger than the predetermined threshold, the determination may be that no bundling was used in the interfering signals. In some embodiments, the threshold may be set differently at RBG boundaries compared to other PRB boundaries. This is because, due to the low PMI granularity, a precoding vector may be identical across multiple subbands, and therefore same precoding across multiple RBGs may be likely, and the threshold may be adjusted accordingly.

In some embodiments, precoder resource bundling evaluation of block 510 may be based on the receipt of assistance information from another network entity, such as a serving and/or neighboring base station, for example. Such assistance information may be in the form of semi-static signaling, for example. In various embodiments, a number of different semi-static signaling options may be used. For example, in some embodiments, the assistance information may include a one-bit indication that indicates precoder resource bundling is to be assumed for all interfering signals or that indicates to disregard precoder resource bundling for interfering signals. In other embodiments, the assistance information may include a one-bit indication per virtual cell ID (VCID) that indicates whether PRB bundling is to be assumed for a signal using that VCID. In other embodiments, semi-static signaling may provide assistance information in the form of a VCID range for which resource bundling can be assumed, and may also indicate that resource bundling includes PRB bundling and/or subframe bundling. In still further embodiments, for a UE configured with CoMP, the precoder resource bundling evaluation may be based on a signal indicating to use the same information as in the CoMP configuration for precoder resource bundling.

In some embodiments, assistance information may be provided in semi-static resource subsets that indicate resources in which precoder resource bundling is present for purposes of IC/IS operations. Such subsets may include, for example, PRB subsets and/or subframe subsets. In some embodiments, signaling may be provided that may be mapped to defined subsets of PRBs and/or subframes. In addition, dependency on multicast-broadcast single frequency network (MBSFN) versus non-MBSFN subframes may be signaled using semi-static resources. For example, in non-MBSFN subframes, the signaling may indicate that bundling is aligned with PRG, and in MBSFN subframes the use of DCI format 1A may reduce the likelihood of PRG alignment. In other examples, PRB bundling can be linked to modulation order. For example, for 256 QAM, a base station may signal that PRB bundling is enabled, and the PRB bundling size can be larger than for other mod order. In other examples, semi-static signaling may indicate that PRB bundling is linked to the type of transmission. For example, if the transmission is a broadcast channel transmission (e.g., paging, SIB, Msg2), the signaling may indicate that no PRB bundling is present for the transmission. Assistance information provided as semi-static bundling indications may be defined in various different ways. For example, one indication may indicate that no bundling is present in interfering signals, and therefore precoder resource bundling may be disregarded in IC/IS operations for the associated interfering signal. Another semi-static indication may indicate that precoder resource bundling is most likely present, although bundling is not strictly enforced in all PRGs. In such a case, IC/IS operations may be modified to account for precoder resource bundling, such as through iterating channel estimations based on interfering signals that are assumed to have resource bundling. Yet another semi-static indication may be that bundling is strictly enforced in all PRGs. In cases where the indication is that bundling is strictly enforced in all PRGs, the signaling may further indicate, for example, that the rank and precoder is identical within PRGs. Additionally, the signaling may also indicate that one or more of a power level or modulation order is also identical within PRGs.

In other embodiments, precoder resource bundling evaluation of block 510 may include evaluation of assistance information received through dynamic signaling. For example, a serving base station may transmit dynamic signaling to a UE related to precoder resource bundling that is present in one or more interfering signals from one or more neighboring base stations. Such signaling may be included, for example, as an indication in at least one of the PDSCH grant or an enhanced PDCCH (EPDCCH) to the UE whether bundling can be assumed for interfering signals in the current subframe. Such an indication may be provided, for example, per virtual cell ID (VCID) informing the UE whether it can assume resource bundling for a signal using that VCID in the current subframe(s). Such an indication also may be provided, for example, through a bitmap that is provided to the UE that indicates specific PRBs and/or subframes that have resource bundling and have the same precoding vector. The indication may also, for example indicate that one or more of rank, power level or modulation order is also identical for indicated PRBs and/or subframes. For example, a PDSCH allocation for a UE may include M PRBs. In such a case, a bitmap of M−1 elements may be provided, and bit k may indicate whether the $k^{th}$ PRB is bundled with the k+1th PRB. In some embodiments, separate signaling in addition to a bitmap may be included that indicates whether the indicated bundling also includes the same modulation order and same PDSCH on/off status across the bundled resources.

Figure 6:
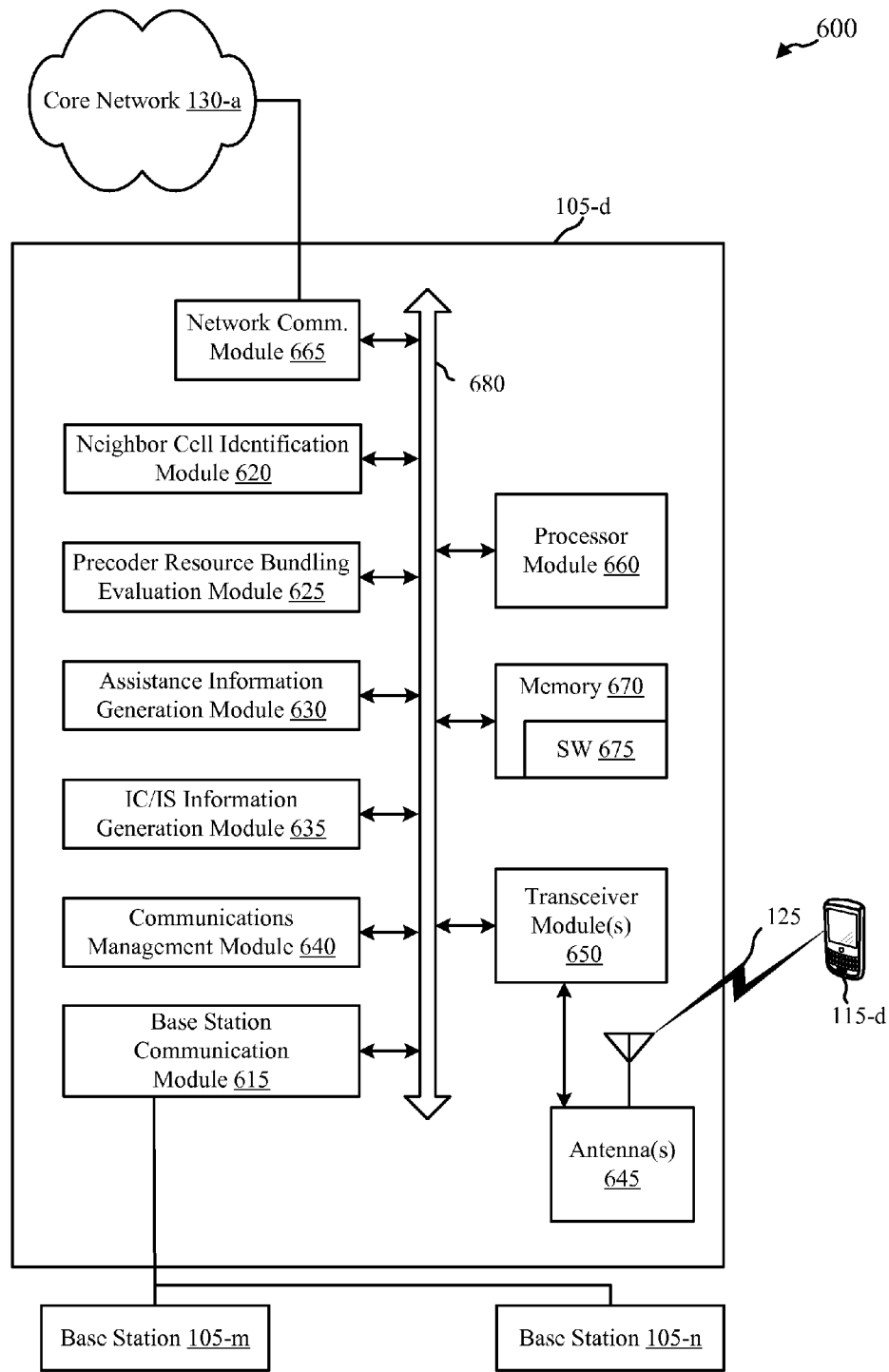
FIG. 6 shows a block diagram of an example of a base station in accordance with various embodiments.

FIG. 6 shows a block diagram of a wireless communications system 600 that may be configured for precoder resource bundling evaluation and associated IC/IS modification. This wireless communications system 600 may be an example of aspects of the wireless communications system 100 illustrated in FIG. 1 or the wireless communications system 200 illustrated in FIG. 2. The wireless communications system 600 may include a base station 105-d. Base station 105-d may be an example of a base station 105 of FIG. 1 or 2. The base station 105-d may include antenna(s) 645, a transceiver module 650, memory 670, and a processor module 660, which each may be in communication, directly or indirectly, with each other (e.g., over one or more buses 680). The transceiver module 650 may be configured to communicate bi-directionally, via the antenna(s) 645, with UE 115-d. The transceiver module 650 (and/or other components of the base station 105-d) may also be configured to communicate bi-directionally with one or more networks. In some cases, the base station 105-d may communicate with the core network 130-a through network communications module 665. Base station 105-d may be an example of a serving base station, a neighboring base station, an eNodeB base station, a Home eNodeB base station, a NodeB base station, and/or a Home NodeB base station.

Base station 105-d may also communicate with other base stations 105, such as base station 105-m and base station 105-n. In some cases, base station 105-d may communicate with other base stations such as 105-m and/or 105-n utilizing base station communication module 615. In some embodiments, base station communication module 615 may provide an X2 interface within an LTE wireless communication technology to provide communication between some of the base stations 105. In some embodiments, base station 105-*d* may communicate with other base stations through core network 130-*a*.

The memory 670 may include random access memory (RAM) and read-only memory (ROM). The memory 670 may also store computer-readable, computer-executable software code 675 containing instructions that are configured to, when executed, cause the processor module 660 to perform various functions described herein (e.g., call processing, database management, message routing, etc.). Alternatively, the computer-executable software code 675 may not be directly executable by the processor module 660 but be configured to cause the processor, e.g., when compiled and executed, to perform functions described herein.

The processor module 660 may include an intelligent hardware device, e.g., a central processing unit (CPU), a microcontroller, an application-specific integrated circuit (ASIC), etc. The transceiver module(s) 650 may include a modem configured to modulate the packets and provide the modulated packets to the antenna(s) 645 for transmission, and to demodulate packets received from the antenna(s) 645. While some examples of the base station 105-*d* may include a single antenna 645, the base station 105-*d* may include multiple antennas 645 for multiple links, which may support carrier aggregation. For example, one or more links may be used to support macro communications with UE 115-*d*.

According to the architecture of FIG. 6, the base station 105-*d* may further include a communications management module 640. The communications management module 640 may manage communications with other base stations 105. By way of example, the communications management module 640 may be a component of the base station 105-*d* in communication with some or all of the other components of the base station 105-*d* via a bus 680. Alternatively, functionality of the communications management module 640 may be implemented as a component of the transceiver module 650, as a computer program product, and/or as one or more controller elements of the processor module 660.

In some embodiments, the transceiver module 650 in conjunction with antenna(s) 645, along with other possible components of base station 105-*d*, may evaluate whether precoder resource bundling is used in interfering signals from neighboring base stations. In some embodiments, base station 105-*d* includes a neighbor cell identification module 620 that determines the presence of one or more neighboring base stations that may transmit one or more interfering signals to UE 115-*d*. This information may be provided to precoder resource bundling evaluation module 625, which may determine the presence and type of precoder resource bundling that is used at the neighboring base stations. Such a determination may be made based on information received from the one or more neighboring bases stations, for example, from some other network entity, and/or from an evaluation of transmissions of the neighboring base station(s). Precoder resource bundling evaluation module 625 may transmit assistance precoder resource bundling information via transceiver module 650 to UE 115-*d*. Assistance information generation module 630 may generate assistance information for UE 115-*d*, such as the semi-static assistance information as described above, or the dynamic assistance information as described above, for example, and may transmit assistance information via transceiver module 650 to UE 115-*d*. Each of the noted modules may be a means for performing one or more functions related to operation of the base station 105-*d*.

Figure 7:
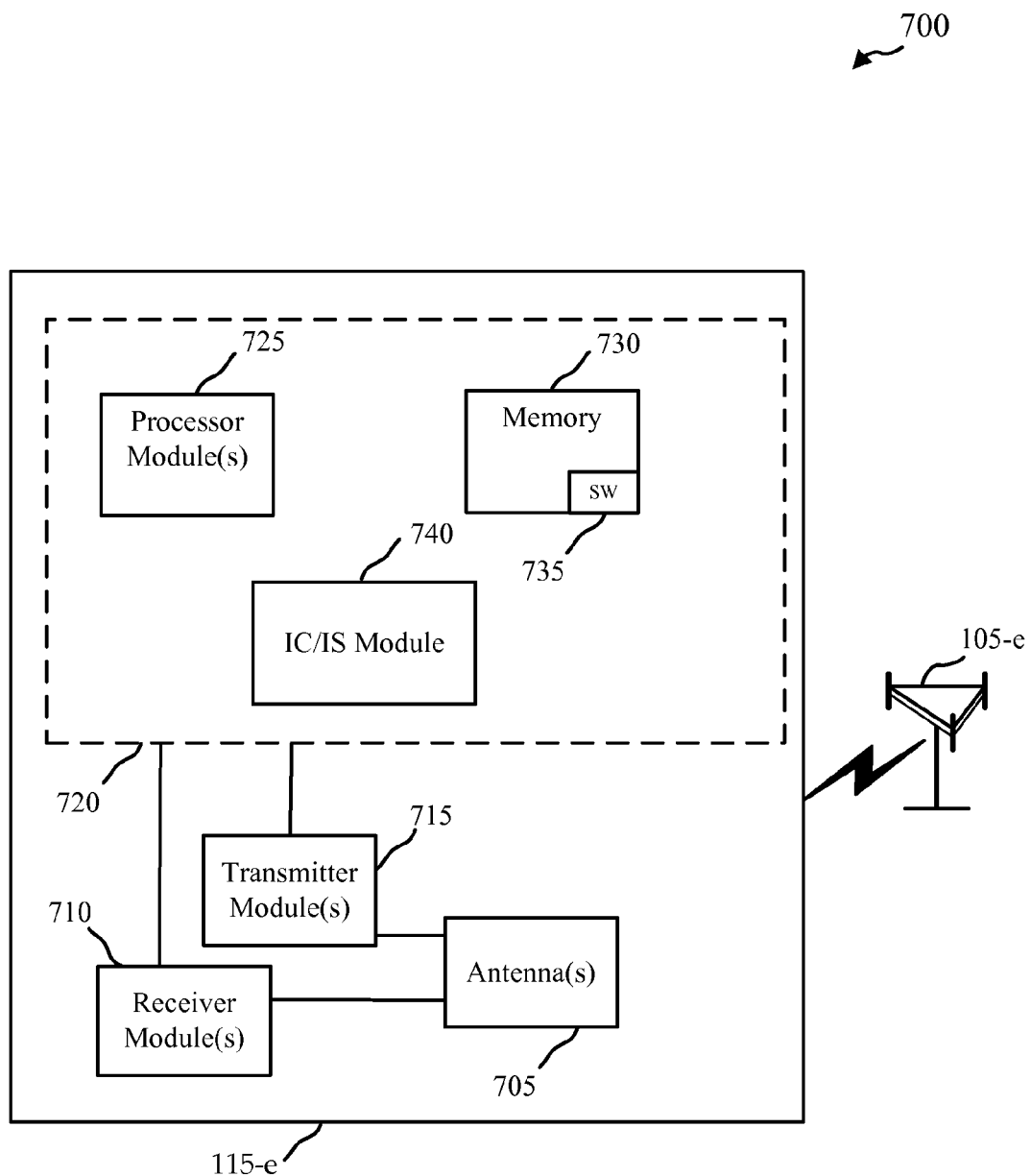
FIG. 7 is a block diagram of an example of a UE in accordance with various embodiments.

With reference now to FIG. 7, an example wireless communications system 700 that performs precoder resource bundling evaluation and IC/IS modification based on precoder resource bundling is depicted. The wireless communications system 700 includes a UE 115-*e* that may communicate with base station 105-*e* to receive access to one or more wireless networks, and may be an example of aspects of the wireless communications system 100 of FIG. 1, the wireless communications system 200 of FIG. 2, or the wireless communications system 600 of FIG. 6. UE 115-*e* may be an example of a UE 115 of FIG. 1, 2 or 6. UE 115-*e*, includes one or more antenna(s) 705 communicatively coupled to receiver module(s) 710 and transmitter module(s) 715, which are in turn communicatively coupled to a control module 720. Control module 720 includes one or more processor module(s) 725, a memory 730 that may include computer-executable software code 735, and an IC/IS module 740. The computer-executable software code 735 may be for execution by processor module 725 and/or IC/IS module 740.

The processor module(s) 725 may include an intelligent hardware device, e.g., a central processing unit (CPU), a microcontroller, an application specific integrated circuit (ASIC), etc. The memory 730 may include random access memory (RAM) and read-only memory (ROM). The memory 730 may store computer-readable, computer-executable software code 735 containing instructions that are configured to, when executed (or when compiled and executed), cause the processor module 725 and/or IC/IS module 740 to perform various functions described herein (e.g., precoder bundling determination, and IC/IS modification). The IC/IS module 740 may be implemented as a part of the processor module(s) 725, or may be implemented using one or more separate CPUs or ASICs, for example. The transmitter module(s) 715 may transmit to base station 105-*e* (and/or other base stations) to establish communications with one or more wireless communications networks (e.g., E-UTRAN, UTRAN, etc.), as described above. The IC/IS module 740 may be configured to evaluate whether interfering signals from one or more neighboring base stations use precoder resource bundling, and modifying IC/IS operations to account for such precoder resource bundling, similarly as described above. In some examples, the IC/IS module 740 may also be configured to receive assistance information from base station 105-*e* related to neighboring cell precoder resource bundling and/or IC/IS modification, and take appropriate actions to modify IC/IS operations associated with one or more portions of one or more subframes, in accordance with examples as described above. The receiver module(s) 710 may receive downlink transmissions from base station 105-*e* (and/or other base stations), as described above. Downlink transmissions are received and processed at the UE 115-*e*. The components of UE 115-*e* may, individually or collectively, be implemented with one or more Application Specific Integrated Circuits (ASICs) adapted to perform some or all of the applicable functions in hardware. Each of the noted modules may be a means for performing one or more functions related to operation of the UE 115-*e*.

Figure 8:
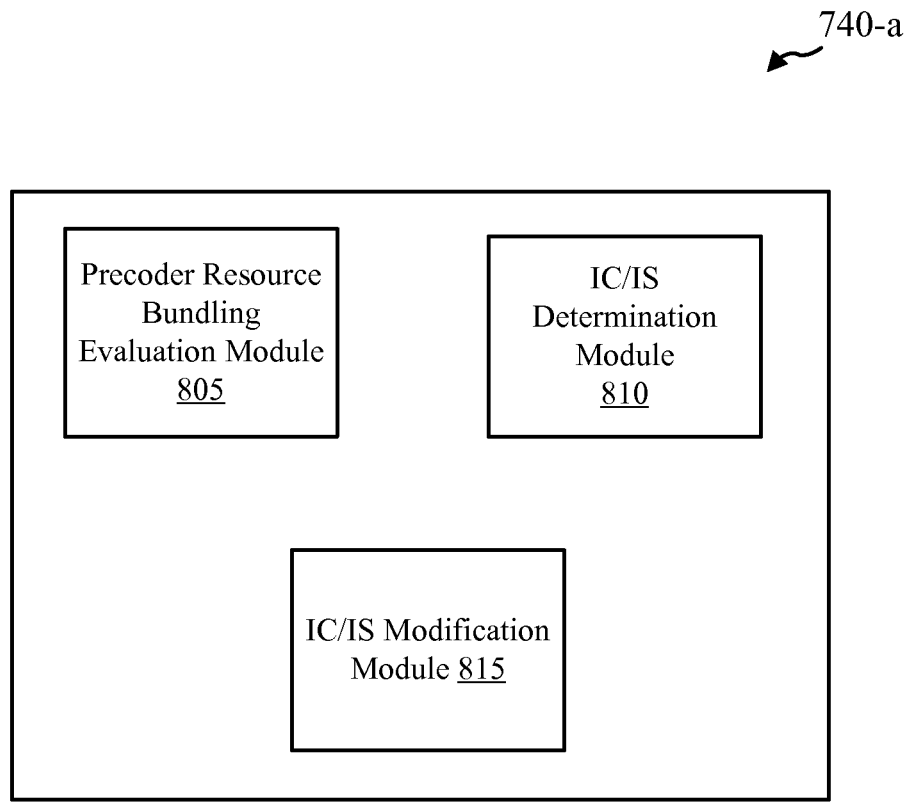
FIG. 8 shows a block diagram of an example of an IC/IS module in accordance with various embodiments.

FIG. 8 illustrates an example of a IC/IS module 740-*a*, which includes a precoder resource bundling evaluation module 805, an IC/IS determination module 810, and an IC/IS subframe modification module 815. The precoder resource bundling evaluation module 805 may evaluate one or more signals received from a serving base station and/or any neighboring base stations, and determine the presence or absence of precoder resource bundling based on the evaluation. In some embodiments, the precoder resource bundling evaluation module 805 may receive assistance information related to precoder resource bundling from a serving base station and/or from some other network entity. In other embodiments, precoder resource bundling evaluation module 805 may evaluate signals in accordance with the examples described above through, for example, blind detection of the resource bundling. The IC/IS determination module 810 may receive precoder bundling information and/or other information (e.g., assistance information) and determine IC/IS to be applied for different subframes received at the UE. IC/IS subframe modification module 815 may modify IC/IS operations at the UE for one or more subframes based on the determination of the IC/IS determination module 810. The components of IC/IS module 740-a may, individually or collectively, be implemented with one or more ASICs adapted to perform some or all of the applicable functions in hardware. Each of the noted modules may be a means for performing one or more functions related to operation of the IC/IS module 740-a.

Figure 9:
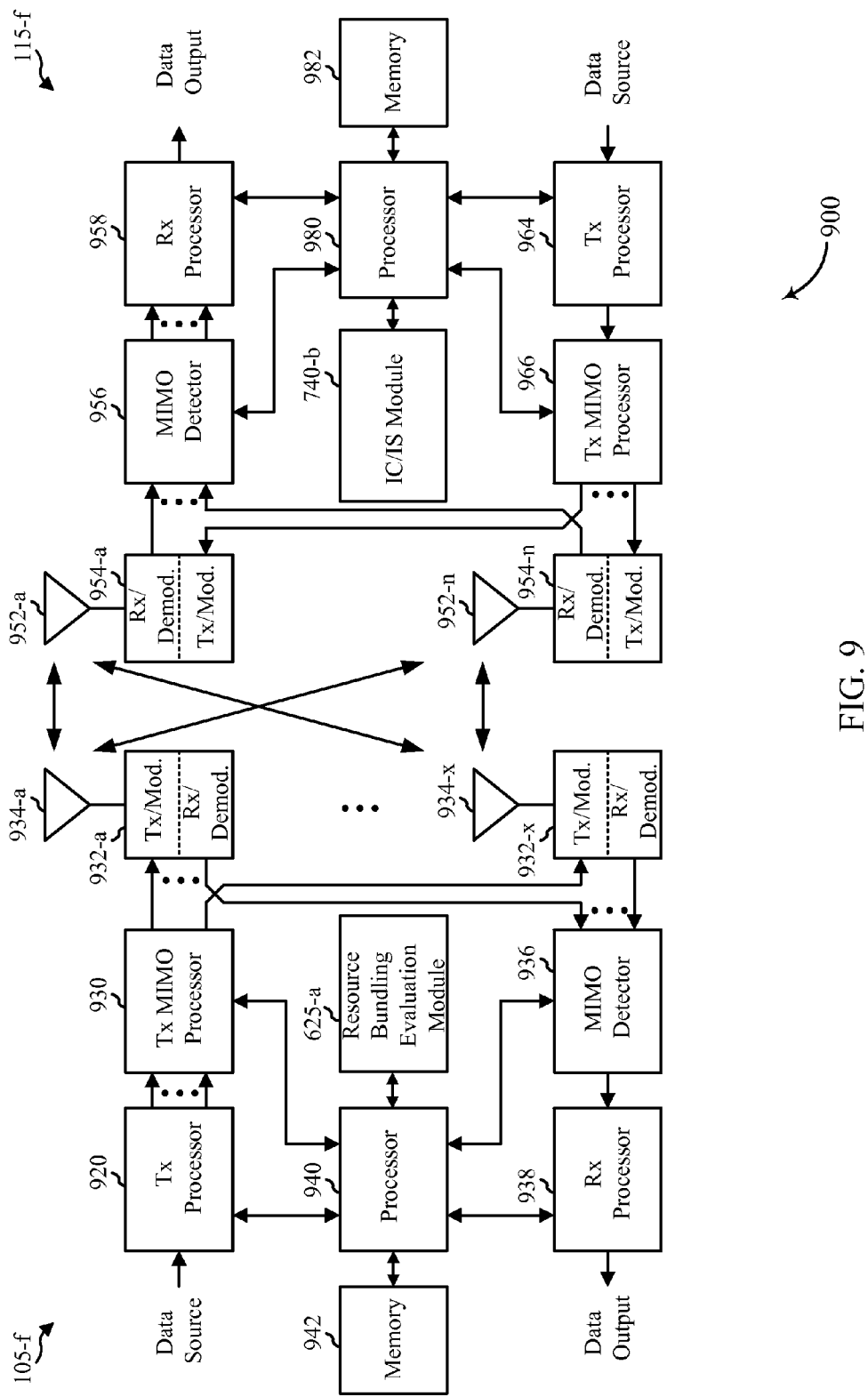
FIG. 9 is a block diagram of an example of a wireless communications system including a base station and a mobile device in accordance with various embodiments.

FIG. 9 is a block diagram of a wireless communications system 900 including a base station 105-f and a UE 115-f. This wireless communications system 900 may be an example of one or more of the wireless communications systems 100, 200, 600, 700, 800, or 900 of FIGS. 1, 2, 6-9. Additionally the wireless communications system 900 may implement one or more aspects of the downlink frame structures 300, 400 described with reference to FIGS. 3-4. The base station 105-f may be equipped with antennas 934-a through 934-x, and the UE 115-f may be equipped with UE antennas 952-a through 952-n. At the base station 105-f, a transmit processor 920 may receive data from a data source.

The transmit processor 920 may process the data. The transmit processor 920 may also generate reference symbols, and a cell-specific reference signal. A transmit (TX) MIMO processor 930 may perform spatial processing (e.g., precoding) on data symbols, control symbols, and/or reference symbols, including using precoding resource bundling if applicable, and may provide output symbol streams to the base station modulator/demodulators 932-a through 932-x. Each base station modulator/demodulator 932 may process a respective output symbol stream (e.g., for OFDM, etc.) to obtain an output sample stream. Each base station modulator/demodulator 932 may further process (e.g., convert to analog, amplify, filter, and upconvert) the output sample stream to obtain a downlink (DL) signal. In one example, DL signals from base station modulator/demodulators 932-a through 932-x may be transmitted via the antennas 934-a through 934-x.

At the UE 115-f, the UE antennas 952-a through 952-n may receive the DL signals from the base station 105-f and may provide the received signals to the UE modulator/demodulators 954-a through 954-n, respectively. Each UE modulator/demodulator 954 may condition (e.g., filter, amplify, downconvert, and digitize) a respective received signal to obtain input samples. Each UE modulator/demodulator 954 may further process the input samples (e.g., for OFDM, etc.) to obtain received symbols. A MIMO detector 956 may obtain received symbols from all the UE modulator/demodulators 954-a through 954-n, perform MIMO detection on the received symbols if applicable, and provide detected symbols. A receive processor 958 may process (e.g., demodulate, deinterleave, and decode) the detected symbols and perform interference cancellation and/or suppression operations on the detected symbols, providing decoded data for the UE 115-f to a data output, and provide decoded control information to a processor 980, or memory 982. The processor 980 may be coupled with an IC/IS module 740-b that may determine and modify IC/IS operations of UE 115-f, such as described above.

On the uplink (UL), at the UE 115-f, a transmit processor 964 may receive and process data from a data source. The transmit processor 964 may also generate reference symbols for a reference signal. The symbols from the transmit processor 964 may be precoded by a transmit MIMO processor 966 if applicable, further processed by the UE modulator/demodulators 954-a through 954-n (e.g., for SC-FDMA, etc.), and be transmitted to the base station 105-f in accordance with the transmission parameters received from the base station 105-f. At the base station 105-f, the UL signals from the UE 115-f may be received by the antennas 934, processed by the base station modulator/demodulators 932, detected by a MIMO detector 936 if applicable, and further processed by a receive processor 938. The receive processor 938 may provide decoded data to a data output and to the processor 940. A memory 942 may be coupled with the processor 940.

A precoder resource bundling evaluation module 625-a may, in some embodiments evaluate signals associated with one or more neighboring base stations and provide information related to precoder resource bundling to processor 940, which may forward information related to precoder resource bundling to UE 115-f. Similarly as discussed above, the wireless communications system 900 may support operation on multiple component carriers, each of which include waveform signals of different frequencies that are transmitted between base station 105-f and devices 115-f. Multiple component carriers may carry uplink and downlink transmissions between UE 115-f and base station 105-f, and base station 105-f may support operation on multiple component carriers. The components of the UE 115-f may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 900. Similarly, the components of the base station 105-f may, individually or collectively, be implemented with one or more Application Specific Integrated Circuits (ASICs) adapted to perform some or all of the applicable functions in hardware. Each of the noted components may be a means for performing one or more functions related to operation of the wireless communications system 900.

Figure 10:
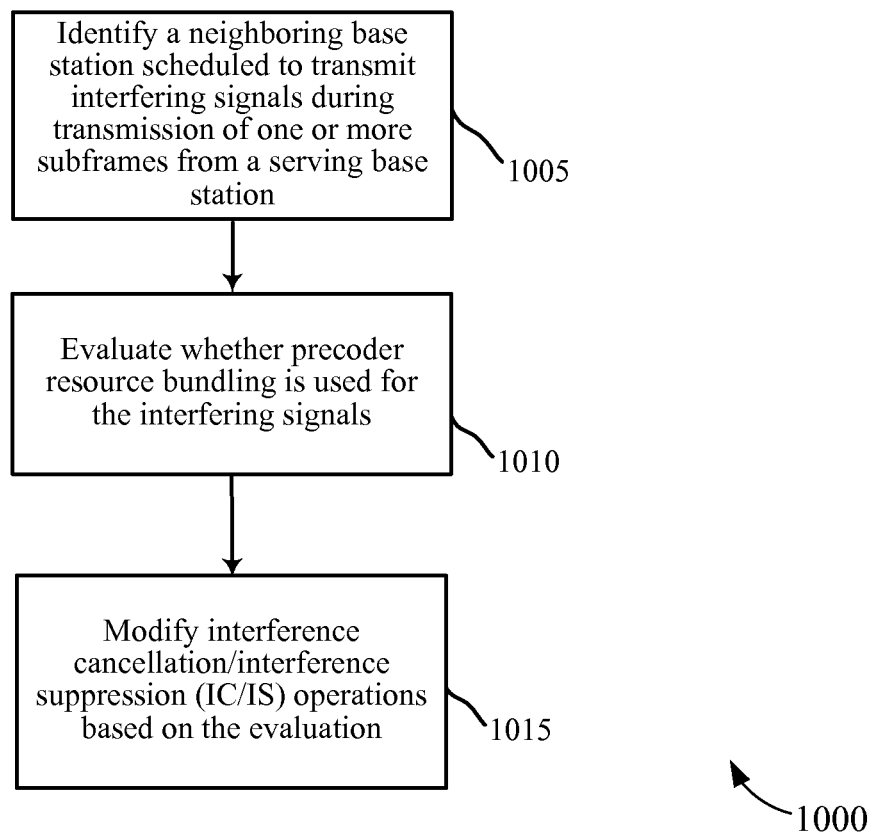
FIG. 10 is a flowchart of a method for IC/IS modification in accordance with various embodiments.

FIG. 10 illustrates a method 1000 that may be carried out by a wireless communications system according to various embodiments. The method 1000 may, for example, be performed by a UE of FIG. 1, 2, 6, 7, or 9, or using any combination of the devices described for these figures. Initially, at block 1005, the UE identifies a neighboring base station scheduled to transmit interfering signals during transmission of a subframe from a serving base station. At block 1010, the UE evaluates whether precoder resource bundling is used for the interfering signals. As mentioned above, the precoder resource bundling may include physical resource block (PRB) bundling across frequency or subframe bundling across time. In some embodiments, the evaluating may include disregarding precoder resource bundling in the absence of an indication from the serving base station that precoder resource bundling is present in the interfering signals Finally, at block 1015, the UE modifies interference cancellation/interference suppression (IC/IS) operations for the subframe responsive to the evaluating.

Figure 11:
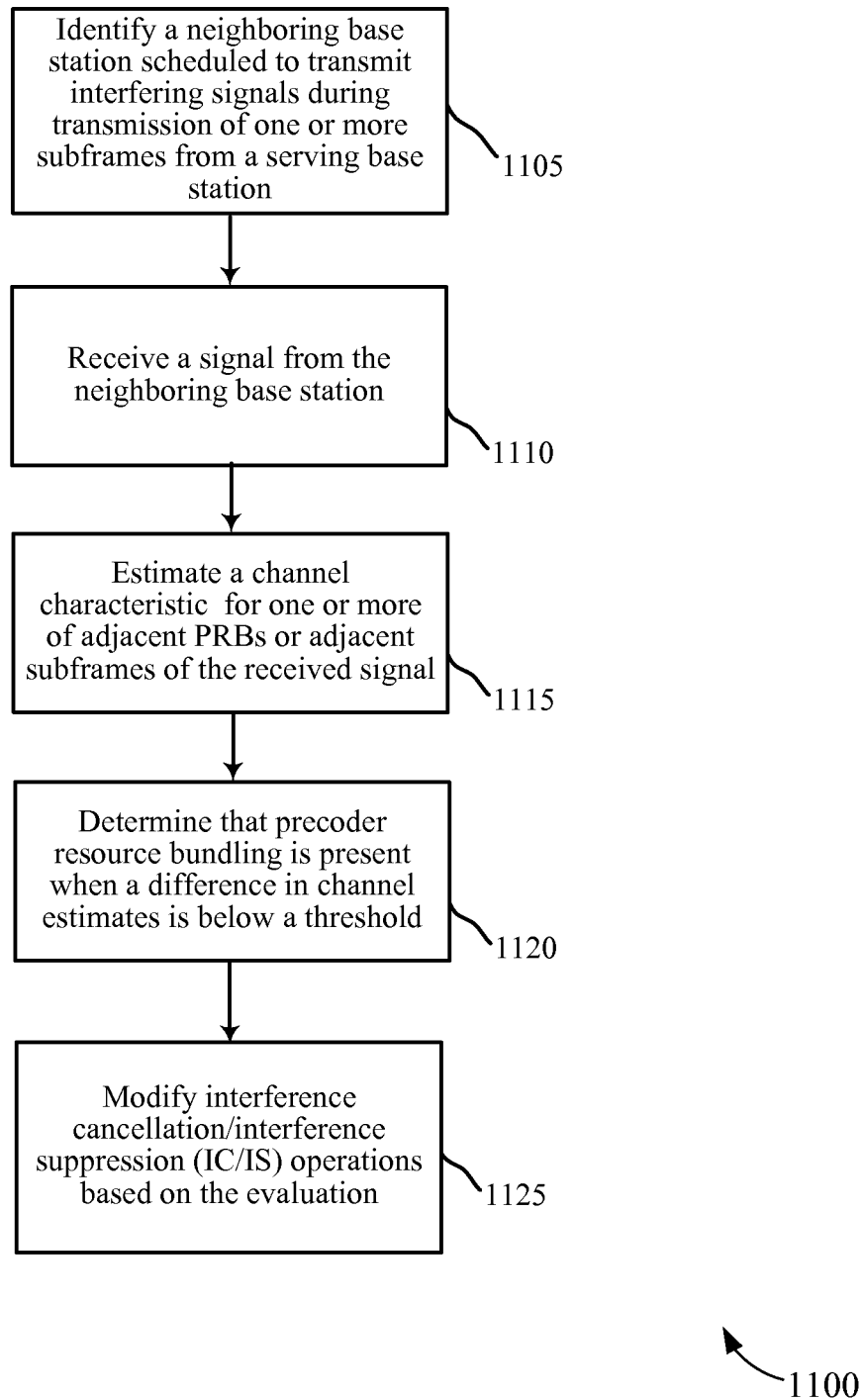
FIG. 11 is a flowchart of another method for IC/IS modification in accordance with various embodiments.

FIG. 11 illustrates a method 1100 that may be carried out by a wireless communications system according to various embodiments. The method 1100 may, for example, be performed by a UE of FIG. 1, 2, 6, 7, or 9, or using any combination of the devices described for these figures. Initially, at block 1105, the UE identifies a neighboring base station scheduled to transmit interfering signals during transmission of a subframe from a serving base station. At block 1110, the UE receives a signal from the neighboring base station. The UE estimates a channel characteristic for one or more of adjacent PRBs or adjacent subframes of the received signal, at block 1115. At block 1120, the UE determines that precoder resource bundling is present when a difference in channel estimates is below a threshold. The threshold may be selected, for example, from two or more thresholds based on a location of a resource block group (RBG) boundary of the received signal relative to the adjacent PRBs or adjacent subframes. Finally, at block 1125, the UE modifies interference cancellation/interference suppression (IC/IS) operations for the subframe responsive to the evaluating.

Figure 12:
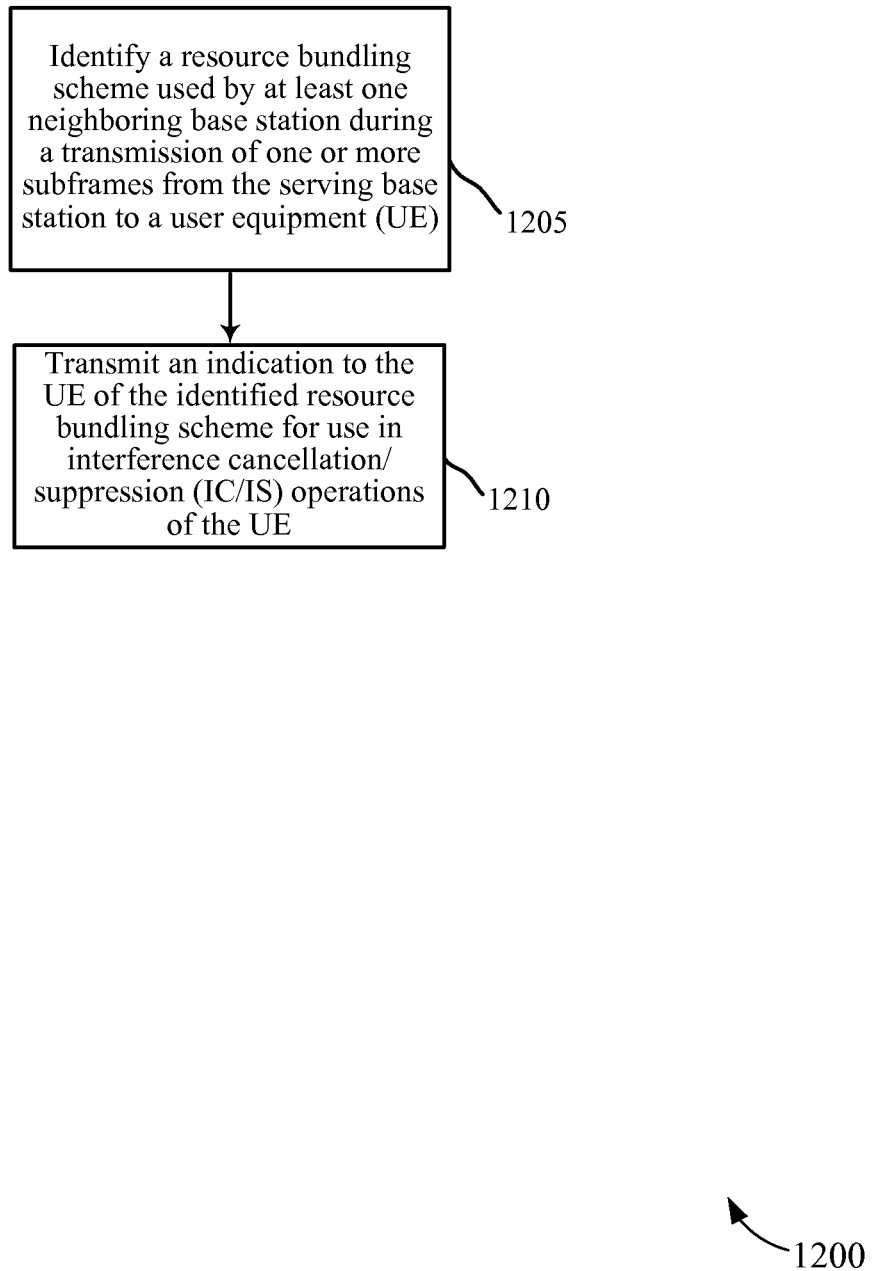
FIG. 12 is a flowchart of another method for IC/IS modification in accordance with various embodiments.

FIG. 12 illustrates a method 1200 that may be carried out by a base station in a wireless communications system according to various embodiments The method 1200 may, for example, be performed by a base station of FIG. 1, 2, 6, 7, or 9, or using any combination of the devices described for these figures. Initially, at block 1205, the base station identifies a resource bundling scheme used by at least one neighboring base station during a transmission of a subframe from the serving base station to a user equipment (UE). At block 1210, the base station transmits an indication to the UE of the identified resource bundling scheme for use in interference cancellation/suppression (IC/IS) operations of the UE. The indication may include, for example, one or more of an indication that resource bundling is not present for one or more interfering signals of the neighboring base station, an indication that resource bundling is present for at least a majority of the one or more interfering signals of the neighboring base station, an indication that resource bundling is present in two or more subframes, or an indication that resource bundling is present in all precoding resource block groups (PRGs) of a subframe of the neighboring base station. In some embodiments, the indication may include a one-bit indication for each of one or more virtual cell identifications (VCIDs) of the one or more neighboring base stations indicating that the UE is to assume the presence of resource bundling for signals using one of the one or more VCIDs. The indication may include an identification of resources that use precoder bundling, and the indication may be, for example, transmitted to the UE in at least one of a physical downlink shared channel (PDSCH) grant or an enhanced PDCCH (EPDCCH).

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications performed by a user equipment (UE), comprising:
    identifying a neighboring base station scheduled to transmit interfering signals during transmission of a subframe from a serving base station;
    receiving a signal from the neighboring base station;
    estimating a channel characteristic for one or more of adjacent physical resource blocks (PRBs) or adjacent subframes of the received signal;
    determining that precoder resource bundling is present when a difference in channel estimates is below a threshold;
    evaluating whether precoder resource bundling is used for the interfering signals based on the determination that precoder resource bundling is present, wherein a number and a location of bundled PRBs of the precoder resource bundling are based at least in part on channel bandwidth;
    modifying interference cancellation/interference suppression (IC/IS) operations for the subframe responsive to the evaluating; and
    performing the modified IC/IS operations on received symbols from a received signal of the subframe.

2. The method of claim 1, wherein the evaluating comprises disregarding precoder resource bundling in an absence of an indication from the serving base station that precoder resource bundling is present in the interfering signals.

3. The method of claim 1, wherein the evaluating comprises determining a likelihood that communications of the neighboring base station include precoder resource bundling.

4. The method of claim 1, wherein the threshold is selected from two or more thresholds based on a location of a resource block group (RBG) boundary of the received signal relative to the adjacent PRBs or adjacent subframes.

5. The method of claim 1, further comprising refining the estimate of the channel characteristics by re-estimating channel characteristics of one or more precoding resource block groups (PRGs) of the received signal that are determined to be bundled.

6. The method of claim 1, further comprising:
    determining whether enhanced physical downlink control channel (EPDCCH) information is present in a precoding resource block group (PRG) of the received signal; and
    excluding one or more PRB pairs corresponding to the EPDCCH from the estimating.

7. The method of claim 1, wherein the evaluating comprises evaluating signals from at least one of the serving base station or the neighboring base station for an indication of whether the UE is to account for a presence of precoder resource bundling for one or more interfering signals or to disregard precoder resource bundling for one or more interfering signals.

8. The method of claim 7, wherein the indication comprises one or more of:
    an indication that precoder resource bundling is not present for one or more interfering signals,
    an indication that precoder resource bundling is present for at least a majority of the one or more interfering signals,
    an indication that precoder resource bundling is present in two or more subframes,
    an indication that precoder resource bundling is present in all precoding resource block groups (PRGs) of a subframe, or
    an indication that precoder resource bundling is present in all precoding resource block groups (PRGs) of a subframe and that, within PRGs, one or more of rank, precoder, power level, or modulation order are identical.

9. The method of claim 7, wherein the indication comprises a one-bit indication for each of one or more virtual cell identifications (VCIDs) indicating whether the UE is to assume the presence of precoder resource bundling for signals using one of the one or more VCIDs.

10. The method of claim 7, wherein the UE includes a configuration for coordinated multi-point (CoMP) transmissions, and the indication comprises an indication that interfering signals have the same configuration as the UE CoMP configuration.

11. The method of claim 7, wherein the indication comprises a subset of resources for which the UE is to assume the presence of precoder resource bundling.

12. The method of claim 1, wherein the evaluating comprises receiving an indication from at least one of the serving base station or the neighboring base station indicating that precoder resource bundling is present for one or more identified modulation orders or one or more identified types of transmissions of the neighboring base station.

13. The method of claim 1, wherein the evaluating comprises receiving an indication of precoder resource bundling in at least one of a physical downlink shared channel (PDSCH) grant or an enhanced PDCCH (EPDCCH) from the serving base station.

14. The method of claim 1, wherein modifying IC/IS operations for the subframe comprises enhancing cancellation of a demodulation-reference signal (DM-RS) based physical downlink shared channel (PDSCH) signal.

15. A wireless communications user equipment (UE) device, comprising:
    at least one processor, and
    a memory coupled with the processor embodying instructions executable by the processor to cause the processor to:
    identify a neighboring base station scheduled to transmit interfering signals during transmission of a subframe from a serving base station;
    receive a signal from the neighboring base station;
    estimate a channel characteristic for one or more of adjacent physical resource blocks (PRBs) or adjacent subframes of the received signal;
    determine that precoder resource bundling is present when a difference in channel estimates is below a threshold;
    evaluate whether precoder resource bundling is used for the interfering signals based on the determination that precoder resource bundling is present, wherein a number and a location of bundled PRBs of the precoder resource bundling are based at least in part on channel bandwidth;

modify interference cancellation/interference suppression (IC/IS) operations for the subframe responsive to the evaluating; and perform the modified IC/IS operations on received symbols from a received signal of the subframe.

16. The device of claim 15, wherein the instructions are further executable by the processor to disregard precoder resource bundling in an absence of an indication from the serving base station that precoder resource bundling is present in the interfering signals.

17. The device of claim 15, wherein the threshold is selected from two or more thresholds based on a location of a resource block group (RBG) boundary of the received signal relative to the adjacent PRBs or adjacent subframes.

18. The device of claim 15, wherein instructions are further executable by the processor to:
determine whether enhanced physical downlink control channel (EPDCCH) information is present in a precoding resource block group (PRG) of the received signal; and
exclude one or more PRB pairs corresponding to the EPDCCH from the estimating.

19. The device of claim 15, wherein the instructions are further executable by the processor to evaluate signals from at least one of the serving base station or the neighboring base station for an indication of whether the UE is to account for a presence of precoder resource bundling for one or more interfering signals or to disregard precoder resource bundling for one or more interfering signals.

20. The device of claim 19, wherein the indication comprises a subset of resources for which the UE is to assume the presence of precoder resource bundling.

21. The device of claim 15, wherein the instructions are further executable by the processor to receive an indication of precoder resource bundling in at least one of a physical downlink shared channel (PDSCH) grant or an enhanced PDCCH (EPDCCH) from the serving base station.

22. The device of claim 15, wherein the instructions are further executable by the processor to enhance cancellation of a demodulation-reference signal (DM-RS) based physical downlink shared channel (PDSCH) signal.

23. An apparatus for wireless communications performed by a user equipment (UE), comprising:
means for identifying a neighboring base station scheduled to transmit interfering signals during transmission of a subframe from a serving base station;
means for receiving a signal from the neighboring base station;
means for estimating a channel characteristic for one or more of adjacent physical resource blocks (PRBs) or adjacent subframes of the received signal;
means for determining that precoder resource bundling is present when a difference in channel estimates is below a threshold;
means for evaluating whether precoder resource bundling is used for the interfering signals based on the determination that precoder resource bundling is present, wherein a number and a location of bundled PRBs of the precoder resource bundling are based at least in part on channel bandwidth;
means for modifying interference cancellation/interference suppression (IC/IS) operations for the subframe responsive to the evaluating; and
means for performing the modified IC/IS operations on received symbols from a received signal of the subframe.

24. The apparatus of claim 23, wherein the threshold is selected from two or more thresholds based on a location of a resource block group (RBG) boundary of the received signal relative to the adjacent PRBs or adjacent subframes.

25. The apparatus of claim 23, further comprising:
means for determining whether enhanced physical downlink control channel (EPDCCH) information is present in a precoding resource block group (PRG) of the received signal; and
means for excluding one or more PRB pairs corresponding to the EPDCCH from the estimating.

26. The apparatus of claim 23, wherein the means for evaluating comprises means for receiving an indication of precoder resource bundling in at least one of a physical downlink shared channel (PDSCH) grant or an enhanced PDCCH (EPDCCH) from the serving base station.

27. A computer program product for performing wireless communications by a user equipment (UE), the computer program product comprising a non-transitory computer-readable medium storing instructions executable by a processor to:
identify a neighboring base station scheduled to transmit interfering signals during transmission of a subframe from a serving base station;
receive a signal from the neighboring base station;
estimate a channel characteristic for one or more of adjacent physical resource blocks (PRBs) or adjacent subframes of the received signal;
determine that precoder resource bundling is present when a difference in channel estimates is below a threshold;
evaluate whether precoder resource bundling is used for the interfering signals based on the determination that precoder resource bundling is present, wherein a number and a location of bundled PRBs of the precoder resource bundling are based at least in part on channel bandwidth;
modify interference cancellation/interference suppression (IC/IS) operations for the subframe responsive to the evaluating; and
perform the modified IC/IS operations on received symbols from a received signal of the subframe.

* * * * *